3,518,212
MONOEPOXIDE RESIN COMPOSITIONS
James E. Ruecke, Rocky River, Ohio, assignor, by mesne assignments, to SCM Corporation, New York, N.Y., a corporation of New York
No Drawing. Filed Aug. 18, 1966, Ser. No. 573,212
Int. Cl. C08g 30/12
U.S. Cl. 260—18                                            1 Claim This invention relates to resins containing epoxide groups.

In one aspect of this invention, monoepoxide resin compositions are provided. In another aspect of this invention, monoepoxide resin compositions are provided that upon reaction with polycarboxylic acids produce an acid resin that may be made into stable water solutions or dispersions after neutralization.

In a still further aspect of this invention, a process for electrocoating, by the deposition of said acid resin upon conductive materials, has been provided.

These and other aspects of this invention will become apparent as this description proceeds.

In accordance with the invention, a controlled proportion of a polyepoxide resin is reacted with a monocarboxylic acid in the presence of an amine at a temperature not substantially above 350° F. The product of this reaction is a monoepoxide resin which can be usefully reacted with polycarboxylic acid resin to produce an acid resin suitable for coating applications.

While the resulting acid resin can be applied as a coating by conventional methods, such as dipping, brushing, or spraying, it is a particular advantage and the preferred mode for their use that they can be employed in an electrocoating process as disclosed by A. E. Gilchrist in U.S. Pat. 3,230,162.

While other acid resins including ones modified with epoxy resins are known to the art, it is the singular advantage and novelty of this invention that one is provided with a resin that is at once water reducible, stable, and upon application and baking having the properties of a tough, hard film as evidenced by high shot impact resistance. The use of this resin also enables one to employ raster cure times at usual baking temperatures, or, conversely, lower baking temperatures for longer times.

With previous aqueous dispersions of polycarboxylic acid resins that were modified with polyepoxide resin it was unlikely to have freedom from changes in storage or to have good dispersion stability because of: (a) an excess of epoxide functionality that would react gradually with carboxylic acid groups or amino solubilizing agents; or (b) the complexity of the resulting modified acid resins. The aqueous polycarboxylic acid resin dispersions of this invention are substantially free from such undesirable effects.

While a reaction between monocarboxylic acid resin and polyepoxide resin will take place at temperatures about 400° F., the product will be complex, since several distinct side reactions may occur. This leads to incompatibility and gelation upon blending and reacting with the polycarboxylic acid resin, and is unsuitable for applications contemplated by this invention. Therefore, lower temperature made possible by use of an amine catalyst is employed to direct the reaction to a monoepoxide resin of restricted, simple molecular species. A secondary amine is preferred for this purpose because it directs the reaction to a species containing one equivalent of epoxide per mole of reaction product. When this is blended with the polycarboxylic acid resin, in accordance with this invention, the reaction takes place between the residual epoxide and carboxyl groups. This system is to be preferred as leading to a more stable aqueous dispersion and one that is less likely to sludge during use, particularly in electrodeposition.

Polyepoxide resins that may be employed as the starting material in the formation of the monoepoxide resin are:

Bisphenol A, epichlorohydrin type, phenolic novolac, epichlorohydrin type, diepoxydicyclo carboxylate, dicyclopentadiene dioxide, and vinylcyclohexene dioxide.

Typical of the monocarboxylic acids that can be employed are: aliphatic acids such as acetic acid or pelargonic acid, aromatic acids such as benzoic acid and substituted benzoic acids such as para tertiary butyl benzoic acid, the fatty acid types derived from tall oil, linseed oil, tung oil, dehydrated castor oil, soya oil, safflower oil, hydroxy fatty acids such as castor oil fatty acids and ricinoleic acid. Unsaturated acids are to be preferred because they will produce a harder film when reacted and the reaction product employed as a coating.

The polycarboxylic acid resins that are to be reacted with the monoepoxide resin are well known to those skilled in the art. Broadly, they include: coupled siccative oils, e.g., coupled glyceride drying or semidrying oils such as sunflower, safflower, perilla, hempseed, walnut seed, dehydrated castor oil, rapeseed, tomato seed, menhaden, corn, tung, soya, oiticica, or the like, the olefinic double bonds in the oil being conjugated or nonconjugated or a mixture, the coupling agent being an acyclic olefinic acid or anhydride, preferably maleic anhydride, but also crotonic acid, citraconic acid, or anhydride, fumaric acid, or coupled glyceride oils that are further reacted with about 2–25% of a polymerizable vinyl monomer; maleinized unsaturated fatty acids; maleinized rosin acids, alkyd resins, e.g., the esterification products of a polyol with a polybasic acid, particularly glyceride drying oil-extended alkyd resins and siccative fatty acid-extended resins; acidic hydrocarbon drying oil polymers such as those made from maleinized copolymers of butadiene and diisobutylene; diphenolic acid and like polymer resins; and acrylic groups such as butyl acrylate-methyl methacrylate-methacrylic acid copolymers, vinyl acetate-acrylic acid copolymers, acrylic acid and lower alkyl ($C_{1-4}$) substituted acrylic acid-containing polymers, i.e., those having carboxyl groups contributed by alpha, beta unsaturated carboxylic acids or residues of these acids, etc.

In order to achieve good dispersion in water subsequent to neutralization an acid value, of the reaction product of monoepoxide resin and polycarboxylic acid resin, of between about 50 and about 200 is desired. Therefore, the acid number of the polycarboxylic acid resin, when all anhydride groups have been fully hydrated, should be at least about 60 and preferably, for best dispersion, between about 75 and about 200 depending on the equivalent weight of the monoepoxide resin.

Amines are employed at three different points in the process of this disclosure. They serve (1) as a catalyst for the reaction between the polyepoxide resin and monocarboxylic acid to form a monoepoxide resin, and (2) as a catalyst for the reaction between the monoepoxide and polycarboxylic resin, and finally as a neutralizing agent for the final polycarboxylic acid.

The amine for reacting a monoepoxide resin and carboxylic acid may be chosen from the group useful for forming and neutralizing polycarboxylic acid resins generally and these are well known to those skilled in the art. Those employed as a neutralizing agent if electrodeposition is contemplated will conform to the disclosure of Gilchrist in U.S. Pat. 3,230,162.

In regard to reaction between polyepoxide resin and monocarboxylic acid resin, it should be observed that secondary amines selected from the group consisting of $C_{1-4}$ lower alkyl amines and $C_{1-4}$ lower alkanolamines such as dibutyl amine, diethanol amine, diisopropanol amine, diethyl amine, and dipropyl amine are preferred. While the use of tertiary amines will lead to a resin that is compatible with the polycarboxylic acid resin and will make a useful coating, functional epoxide sites will be tied up and the improvement desired from the presence of functional epoxide groups is therefore reduced. The use of primary amines, on the other hand, requires delicate reaction control to avoid undesirable side reactions leading to a product that is incompatible with the polycarboxylic acid resin. Amine catalysts having labile hydrogen are consumed eventually by the resulting monoepoxide.

A tertiary amine as a catalyst for the reaction between the resulting monoepoxide resin and the polycarboxylic acid resin can be expected to yield the most stable dispersions. Therefore, in the preferred mode of this invention, a secondary amine will be employed in the first reaction, and a tertiary amine will be employed in the second reaction (i.e. between monoepoxide resin and polycarboxylic acid resin).

In general, the process of this invention involves (in the first reaction) the formation of a novel monoepoxide resin through the reaction of a polyepoxide resin and a monocarboxylic resin in the presence of an amine catalyst. The polyepoxide resin should have a molecular weight of between about 140 and about 1600, though molecular weights of between 380 and 1400 are preferred for efficiency and economy. Molecular weights above about 1600 produce monoepoxide resins of excessive molecular weight resulting in low reactivity and consequent incompatability with polycarboxylic compounds, while those below 140 fail to give an impact resistance of significant improvement over resins already available.

The polyepoxide resin is mixed with the monocarboxylic acid in any suitable vessel. To this mixture is added a catalytic proportion of amine as discussed heretofore. Based upon the weight of co-reactants 0.1 to 2.0% by weight of amine will accomplish the desired result when operating at temperatures near 350° F., though a temperature in the neighborhood of 300° F. is to be preferred. Those skilled in the art will adjust the amine to the lowest level consonant with the desired catalytic effect. A low catalyst level as possible is desirable because primary and secondary amine in excess will react with epoxide groups and thus tie up functional epoxy sites that one desires to be available for subsequent reaction with polycarboxylic acid resin.

Co-reactants are to be proportioned on a basis of $n-1$ moles of monocarboxylic acid to one mole of polyepoxide resin containing $n$ equivalents of epoxy groups in order to yield a product containing essentially one equivalent of epoxide per mole of reaction product. The reaction vessel containing the catalyst and co-reactants is heated to a temperature of between 280° and 300° F. and agitated until the acid value of the contents is approximately zero, which normally requires ½ to one hour. If an unsaturated fatty acid is employed for this purpose, those skilled in the art will appreciate that it is desirable to have the reaction take place in an inert atmosphere to avoid dimerization. The product is then removed from the reactor, and then may be stored for further use or reacted at once with polycarboxylic acid resin.

Polycarboxylic acid resins useful for the practice of this invention are well known to those skilled in the art. If anhydride groups are present in the polycarboxylic acid reactant, it is preferred to hydrolyze them prior to the reaction with the monoepoxide resin to avoid possible undesirable side reactions. It is preferred to react the polycarboxylic acid resin with the monoepoxide resin in a proportion of 1 epoxy equivalent per about 2.5 carboxyl equivalents for dispersing efficiency. However, a reaction product having ample remaining acidity for neutralization and stable dispersion in water can be obtained by a reaction mixture containing, on the basis of the weight of mixed resins, about 10–15% or most advantageously 30–45% by weight of monoepoxide resin.

The mixture is then heated at a preferred temperature of 180° to 190° F. If water (e.g. from hydration of anhydride groups is present) temperatures above 190° F. result in excessive foaming and are generally avoided. If water is absent, higher temperatures up to 250° F. are possible and desirable. Temperatures in excess of 250° F. are to be avoided to prevent undesired hydroxyl esterification. The preferred temperature range of 180° to 190° F. will give good reaction in ½ to 1 hour.

The reaction generally is run until the monoepoxide is substantially completely reacted, or at any rate at least until the resulting product can be made into a stable aqueous dispersion upon neutralization with a water soluble amine or ammonia. Resulting acid value will be between about 50 and 200 for obtaining each dispersibility. Pigments, tints, and fillers can be added to the resin at this stage or subsequently. The resin can be used as part or all of an acidic paint concentrate as taught by U.S. Pat. 3,230,162, or neutralized with water soluble amines or ammonia and diluted with water for use as part or all of a conventional coating composition or as an electrocoating bath starter composition.

This invention is further illustrated by the following examples which are illustrative of this invention rather than restrictive of its scope.

EXAMPLE 1

To form the monoepoxide resin, 156 grams of bisphenol A, epichlorohydrin type, a diepoxide resin having an epoxide equivalent of 425 to 550, and a Durran softening point of 65° to 75° C. was mixed with 41 grams of a common type dehydrated castor oil fatty acid and 2.3 grams of diisopropanol-amine in stainless steel reactor equipped with a mixer and heated to 300° F. for about one hour until an acid value of zero was obtained.

To form the polycarboxylic acid resin, 7800 grams of linseed oil and 2200 grams of maleic anhydride were reacted at about 232° C. for about one hour at a Gardner-Holt viscosity of E–G at 60% solids in xylol. To 2000 grams of this product, 174 grams of water and 24 grams of triethylamine were added and the mixture heated to 180° F. to 190° F. for ½ hour to hydrolyze most of the anhydride groups present.

To form the epoxy modified polycarboxylic acid resin, 271 grams of the product from first step and 729 grams of the maleinized oil were then blended and reacted by heating at 180° to 190° F. for ½ hour.

EXAMPLE 2

A pigment grinding vehicle was made by dissolving 1000 grams of the resin solids of the reaction between linseed oil and maleic anhydride in a mixture comprised of 350 grams diisopropanolamine and 1350 grams water.

(A) A pigment base for an electrocoat primer formulation was made as follows:

|  | G. |
|---|---|
| Maleinized oil grinding vehicle | 2000 |
| Water | 2000 |
| Acetylenic glycol defoamer | 17 |
| Clay | 3100 |
| Titanium dioxide | 1500 |
| Red iron oxide | 910 |
| Lead chromate | 100 |
| 50/50 diisopropanolamine/water | 95 |

The above ingredients were dispersed to desired fineness of 7 N.S. on sandmill, then thinned with 278 g. water to yield 10,000 g. of pigment base.

An electrocoating primer formulation was made from this pigment base and the resin resulting from the reaction, of Example 1, between the monoepoxide resin and the polycarboxylic acid resin, as follows:

|  | G. |
|---|---|
| Resin of Example 1 | [1] 219 |
| Fatty diamine derived from tall fatty acid | [1] 9.55 |
| 50% diisopropanolamine in water | [1] 41 |
| Water | [1] 300 |
| Pigment base | [2] 134.5 |
| Water | [2] 106 |

[1] Mix together at 150–160° F.
[2] Mix into above.

For electrodeposition, the concentrate was thinned with 2790 g. of water, producing a bath that resulted in approximately 1 mil of coating on a metal anode under an impressed D.C. voltage of 250 and immersion time of 2 minutes with a bath temperature of 90° F.

A test of the resulting electrodeposited film, when applied over zinc phosphated treated cold rolled steel and cured 20 minutes at 350° F., produced the following test results:

(1) Salt spray resistance of scribed films, both untopcoated and topcoated with an automotive thermosetting acrylic enamel, exceeded 250 hours.

(2) Shot impact exposure of the topcoated film resulted in no removal of the film from the substrate. An automotive non-aqueous solvent based epoxy primer control showed 5–10% film removal in the same test.

EXAMPLE 3

An automotive type primer-surfacer for spray application was prepared according to Example 1 by reacting 1723 g. of monoepoxide resin and 4423 g. of polycarboxylic acid resin at 180°–190° F. for one hour in the presence of 55 g. of water and 48 parts of triethylamine. The entire quantity of this reaction product then was dissolved in 7877 g. of water containing 650 g. of 28% aqua ammonia and 96.5 g. of diisopropanolamine. When the mixture was uniform, an additional 1048 g. of water were stirred in to obtain the completed vehicle.

The following ingredients were stirred together and passed through a sandmill to yield a pigment base having 6¾ N.S. fineness:

|  | G. |
|---|---|
| Red iron oxide | 1771 |
| Barytes | 6643 |
| Talc | 443 |
| The vehicle prepared above | 2215 |
| Water | 1882.5 |
| Acetylenic glycol defoamer | 43 |

To complete the primer-surfacer formulation, 11,503 g. of pigment base and 7,911 g. of vehicle were blended together and additional 171 g. of defoamer were added.

The primer-surfacer was spray applied to zinc phosphate treated cold rolled steel panels to a dry film thickness of 1.0–1.25 mils and cured 20' at 350° F. Salt spray and shot impact exposures of the panels, both without and with automotive thermosetting acrylic topcoat, yielded results comparable to the control which was an automotive non-aqueous, solvent-based epoxy primer.

What is claimed is:

1. A process for making an epoxide modified polycarboxylic acid resin suitable for electrocoating which comprises: forming a monoepoxide resin comprising the reaction product of:
   (1) one mole of polyepoxy resin having $n$ epoxy equivalents per mole,
   (2) $n-1$ mols of a monocarboxylic acid,
   (3) from 0.1–2% of a secondary amine by weight of said polyepoxy resin and said monocarboxylic acid, said secondary amine selected from the group consisting of $C_{1-4}$ lower alkyl amines and $C_{1-4}$ alkanolamines at a temperature not substantially above 350° F.; and then reacting said monoepoxide resin with a polycarboxylic acid resin having an acid value of at least 60 in relative proportions of monoepoxide and polycarboxylic acid resin supplying an acid value between about 50 and about 200, said polycarboxylic acid resin comprising the reaction product of an $\alpha,\beta$-unsaturated dicarboxylic acid or anhydride thereof coupled with a siccative oil, the reaction between said monoepoxide resin and said polycarboxylic acid resin conducted at a temperature not substantially above 250° F. for suppressing the carboxyl-hydroxyl reaction and formation of water.

References Cited

UNITED STATES PATENTS

| 3,355,401 | 11/1967 | Tanner | 260—18 |
| 3,305,501 | 2/1967 | Spalding | 260—18 |
| 2,934,506 | 4/1960 | Hicks et al. | 260—18 |
| 2,759,901 | 8/1956 | Greenlee | 260—18 |

OTHER REFERENCES

Epoxy Resins: Lee and Neville; McGraw-Hill; New York, 1957; pp. 45 to 48.

DONALD E. CZAJA, Primary Examiner

C. W. IVY, Assistant Examiner

U.S. Cl. X.R.

117—132; 204—181; 260—22, 23, 29.2, 37